United States Patent
Meshchaninov et al.

(10) Patent No.: US 11,859,814 B2
(45) Date of Patent: Jan. 2, 2024

(54) REACTOR FOR WASTE DISPOSAL

(71) Applicants: Mikhail Aleksandrovich Meshchaninov, Zhukovskiy (RU); Dmitrii Yanovich Agasarov, Krasnodar (RU); Anton Viktorovich Sergeev, Krasnodar (RU)

(72) Inventors: Mikhail Aleksandrovich Meshchaninov, Zhukovskiy (RU); Dmitrii Yanovich Agasarov, Krasnodar (RU)

(73) Assignees: Mikhail Aleksandrovich Meshchaninov, Zhukovskiy (RU); Dmitrii Yanovich Agasarov, Krasnodar (RU); Anton Viktorovich Sergeev, Krasnodar (RU)

(*) Notice: Subject to any disclaimer, the term of this patent is extended or adjusted under 35 U.S.C. 154(b) by 0 days.

(21) Appl. No.: 18/221,733

(22) Filed: Jul. 13, 2023

(65) Prior Publication Data

US 2023/0356174 A1    Nov. 9, 2023

Related U.S. Application Data

(63) Continuation of application No. PCT/IB2022/058935, filed on Sep. 21, 2022.

(30) Foreign Application Priority Data

Dec. 30, 2021 (RU) .................... 2021140063

(51) Int. Cl.
B01J 19/08    (2006.01)
F23G 5/40    (2006.01)
(Continued)

(52) U.S. Cl.
CPC ............. *F23G 5/40* (2013.01); *B01J 19/087* (2013.01); *B09B 3/50* (2022.01); *B09B 3/70* (2022.01);
(Continued)

(58) Field of Classification Search
CPC ............. B01J 19/087; B01J 2219/0809; B01J 19/088; B01J 19/08; B01J 2219/0869;
(Continued)

(56) References Cited

U.S. PATENT DOCUMENTS

2004/0237788 A1* 12/2004 Mischkulnig ............. B03C 3/41
96/95
2005/0021102 A1    1/2005 Ignagni et al.
(Continued)

FOREIGN PATENT DOCUMENTS

CN    1316615 A    10/2001
CN    103204467 A    7/2013
(Continued)

OTHER PUBLICATIONS

Search report in PCT/IB2022/060911, dated Feb. 28, 2023.
(Continued)

*Primary Examiner* — Xiuyu Tai
(74) *Attorney, Agent, or Firm* — Bardmesser Law Group

(57) ABSTRACT

The invention relates to devices for disposal of waste in solid, liquid and gaseous state thereof, in particular, it relates to devices for providing waste disposal by plasma-chemical destruction. A technical effect obtained by this invention is implementation of a reactor providing destruction of both organic and inorganic substances of residential solid and/or liquid waste. The technical effect is obtained by a reactor provided in form of a closed cavity having an input orifice connected to a waste feed apparatus and an output orifice for outputting gaseous products of destruction. Inner surfaces of (Continued)

the cavity are made electrically conductive entirely or partially and an electrode is inserted into the reactor. The electrode is isolated from the conductive surfaces and connected to a source of high-voltage pulses, and size of a gap between the electrode and the conductive surfaces of the cavity provides formation of plasma streamers by corona discharge.

19 Claims, 2 Drawing Sheets

(51) Int. Cl.
*F23G 5/08* (2006.01)
*B09B 3/50* (2022.01)
*B09B 3/70* (2022.01)
B09B 101/25 (2022.01)

(52) U.S. Cl.
CPC ....... *F23G 5/085* (2013.01); *B01J 2219/0809* (2013.01); *B09B 2101/25* (2022.01)

(58) Field of Classification Search
CPC ........ B01J 2219/0884; B01J 2219/0894; B01J 2219/0847; B01J 2219/0849; B01J 2219/0841; B09B 3/70; B09B 2101/25; B09B 3/50; F23G 5/40; F23G 5/085; H05H 1/2406; H05H 1/247; H05H 1/47; H05H 1/48; H05H 1/473; A01G 7/06; A01N 59/00; A01N 25/02; A61L 9/00; C05G 5/23; C05C 5/00; C05C 11/00; C02F 1/4608; C02F 1/74; C02F 2201/4614; C02F 2301/08; C02F 2201/46145; C02F 2209/06; C02F 2201/008; C02F 2201/4611; C02F 1/68; C02F 2209/15; C02F 2305/023

See application file for complete search history.

(56) References Cited

U.S. PATENT DOCUMENTS

| 2008/0023317 | A1* | 1/2008 | Malik | H05H 1/2406 |
| --- | --- | --- | --- | --- |
| | | | | 204/164 |
| 2008/0208280 | A1 | 8/2008 | Lindenthaler et al. | |
| 2010/0072055 | A1* | 3/2010 | Tanaka | B03C 3/366 |
| | | | | 422/186.04 |
| 2012/0269677 | A1* | 10/2012 | Zhou | B03C 3/41 |
| | | | | 422/4 |
| 2013/0318947 | A1 | 12/2013 | Malik et al. | |
| 2014/0142652 | A1 | 5/2014 | Francois et al. | |
| 2016/0067485 | A1 | 3/2016 | Lindenthaler et al. | |
| 2020/0164207 | A1 | 5/2020 | Meyyappan et al. | |
| 2021/0104906 | A1 | 4/2021 | Wang et al. | |

FOREIGN PATENT DOCUMENTS

| CN | 103368447 | A | 10/2013 |
| --- | --- | --- | --- |
| CN | 205288095 | U | 6/2016 |
| CN | 110995050 | A | 4/2020 |
| EA | 012275 | B1 | 8/2009 |
| ES | 2909949 | A1 | 5/2022 |
| FR | 1237539 | A | 7/1960 |
| GB | 516158 | A | 12/1939 |
| JP | H08299747 | A | 11/1996 |
| KR | 20080050318 | A | 6/2022 |
| KZ | 24850 | A4 | 11/2011 |
| RU | 2116244 | C1 | 7/1998 |
| RU | 2122519 | C1 | 11/1998 |
| RU | 12220 | U1 | 12/1999 |
| RU | 61705 | U1 | 3/2007 |
| RU | 2326487 | C2 | 6/2008 |
| RU | 2410835 | C1 | 1/2011 |
| RU | 122466 | U1 | 11/2012 |
| RU | 2592085 | C1 | 7/2016 |
| RU | 2741004 | C1 | 1/2021 |
| RU | 2753275 | C1 | 8/2021 |
| UZ | 5108 | B | 4/2002 |
| UZ | 4426 | C | 10/2011 |
| WO | 2012/044875 | A1 | 5/2012 |

OTHER PUBLICATIONS

Ecotechnics, Equipment for cleaning processes for industrial gases and liquids: A study guide / D.E. Smirnov (et al.); gen. ed. by L.V. Chekalov, A.V. Sugak.—Yaroslavl: YaGTU publ., 2013.—180 pages. ISBN 978-5-9914-0351-1.

Aristova N.A., Piskarev I.M., Ivanovskiy A.V., Selemir V.D., Spirov G.M., Shlepkin S.I., Initiation of chemical reactions by electrical discharge in dielectric-gas-liquid configuration // Physical Chemistry Journal, 2004, vol. 78, #7, pp. 1326-1331.

Piskarev I.M., Oxidation-reduction processes in water initiated by electrical discharge above water surface // General Chemistry Journal, 2001, vol. 71, Issue 10, p. 1622.

Search report in PCT/IB2022/058934, dated Dec. 15, 2022.
Search report in PCT/IB2022/058935, dated Dec. 22, 2022.
Search report in PCT/IB2022/058937, dated Dec. 15, 2022.
Search report in PCT/IB2022/060872, dated Mar. 2, 2023.
Search report in PCT/IB2022/060909, dated Mar. 2, 2023.

Rybka D. V. et al., Koronnyi razryad v vozdukhe atmosfernogo davleniya pri modul'nnom impul'se napryazheniya dlitel'nosti 10 ms (Coronal discharge in air of atmospheric pressure with modular voltage impulse of duration 10 ms), Optika atmosfery i okeana (Optics of atmosphere and ocean), 26, No. 1, 2013.

* cited by examiner

REACTOR FOR WASTE DISPOSAL

FIELD OF THE INVENTION

The invention relates to devices for disposal of waste in solid, liquid and gaseous state thereof, in particular, it relates to devices for providing waste disposal by plasma-chemical destruction.

PRIOR ART

There is a known method of conversion of solid organic waste according to patent RU 2741004 (published on 22 Jan. 2021), wherein conversion of solid organic waste is performed by way of steam plasma gasification with obtaining syngas. The treatment is provided using a high-temperature plasma reactor that employs water steam as a plasma forming gas and provides a temperature of about 1600-2000° C. in the active area.

Limitations of this reactor are incomplete conversion of solid organic waste since the result of conversion is syngas that shall also be converted, and its inability to convert non-organic substances of residential solid waste.

SUMMARY OF THE INVENTION

A technical effect obtained by this invention is implementation of a reactor providing destruction of both organic and inorganic substances of residential solid and/or liquid waste.

The technical effect is obtained with a reactor provided in form of a closed cavity having an input orifice connected to a waste feed apparatus and an output orifice for outputting gaseous products of destruction. Inner surfaces of the cavity are made electrically conductive entirely or partially and an electrode is inserted into the reactor, wherein the electrode is isolated from the conductive surfaces and connected to a source of high-voltage pulses and size of a gap between the electrode and the conductive surfaces of the cavity provides formation of plasma streamers of corona discharge.

Preferably, the electrode is cylindrically shaped and has a sharpened tip.

Preferably, the electrode is made of steel.

In one embodiment, the cavity bottom is covered with a conductive moisture-contained liquid.

Preferably, the gap between the electrode and at least one portion of the inner conductive surfaces of the cavity or surface of the conductive moisture-contained liquid covering such a portion is provided in range of 5 to 50 mm.

Preferably, the conductive portions of the inner surfaces of the cavity are made of steel or other metal and grounded.

In one embodiment, inner non-conductive surfaces of the cavity may have a protective coating made of a dielectric material.

In one embodiment, the cylindrical electrode is equipped with ribs provided in form of steel strips attached to the electrode by short sides thereof, while long sides of the steel strips are directed to the electrode and the ribs are angularly disposed relative to the electrode towards the sharpened tip of the electrode.

Preferably, the angle between the steel strips and the electrode axis is selected in range of 20 to 60 degrees. Preferably, 3 to 6 steel strips are to be used.

In one embodiment, the cavity bottom is flat and conductive and the cylindrical electrode is located transversally to the bottom with a gap.

In one embodiment, a steel grid is secured in parallel to the bottom through isolating spacers attached to the bottom. The grid has an opening for the cylindrical electrode so as a gap is formed around the electrode and free ends of the ribs abut on the isolating spacers secured to the grid.

Preferably, the gap around the cylindrical electrode is provided in range of 3 to 10 mm, but it is less than the gap between the cylindrical electrode tip and the conductive bottom. Preferably, pressure inside the reactor is lower than atmospheric pressure by 0.1 to 1 Pa.

In one embodiment, the under-pressure inside the reactor is provided by connecting an electrostatic filter with a sucking air blower to the output orifice. Preferably, the reactor is implemented with limitation of intake of air. In one embodiment, the limitation of intake of air is provided by use of a wad that closes the reactor inlet, wherein the wad is pre-formed by pressurizing waste prior to feeding to the reactor.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Reference will now be made in detail to the preferred embodiments of the present invention, examples of which are illustrated in the accompanying drawings.

Figure 1:
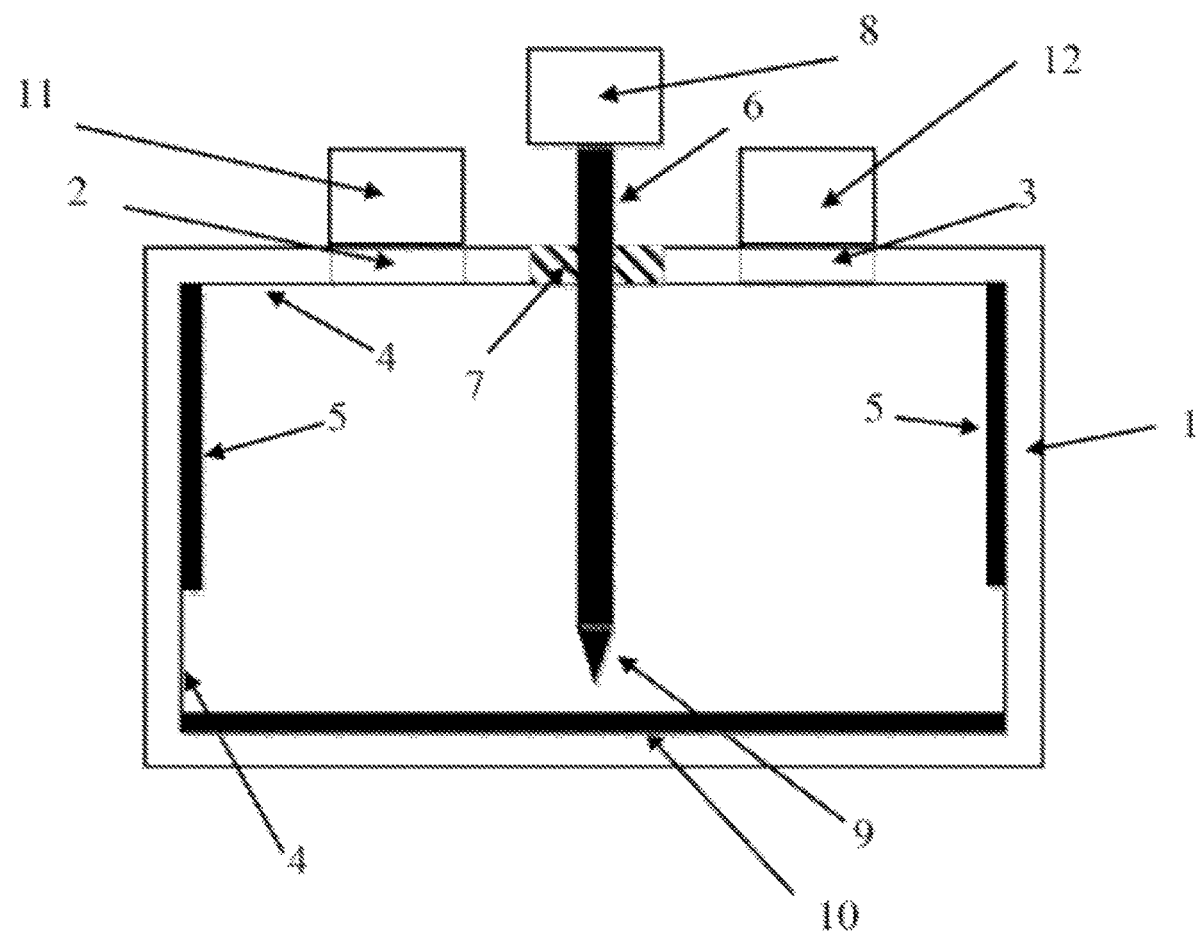
FIG. 1 shows a vertical cross-section of the reactor.

FIG. 1 shows a vertical cross-section of the reactor with the following designators:

1—reactor body with inner cavity;
2—input opening;
3—output opening;
4—inner surface of reactor cavity;
5—conductive portions of inner surface of reactor cavity;
6—tipped electrode;
7—isolating members;
8—source of high-voltage pulses;
9—electrode tip;
10—conductive bottom of reactor;
11—device for dosed loading waste to be treated;
12—electrostatic filter with extraction air fan providing depression at reactor output.

The invention may be implemented in a reactor having a body. The reactor body has an input orifice 2 connected to an apparatus 11 for metered feed of solid and/or liquid waste to be processed. The apparatus 11 is configured to limit amount of air that is let into the reactor. The reactor body has an output orifice 3 intended for removing gaseous destruction products and connected to an electrostatic filter with a sucking air blower. Portions 5 of the body cavity inner surface and a bottom 10 are made of steel. An electrode 6 is inserted into the cavity of the body 1 through an isolating spacer 7. The electrode 6 is connected to a source 8 of high-voltage pulses. A tip 9 of the electrode 6 is located with a gap of 20 mm relative to the conductive bottom 10 of the reactor body 1.

The device is operated in the following way. High-voltage pulses are fed to the electrode 6 from the source 8. As known from [1], each pulse causes a large number of streamers in the neighborhood of the tip 9 of the electrode 6. The streamers multiply and spread towards the conductive bottom 10 of the body 1, gradually populating the interelectrode gap and forming corona discharge. After that, for example, a portion of pressed solid residential waste is fed into the device from the apparatus 11 for metered feed of waste to be processed via the input orifice 2, so intake of atmospheric air into the body 1 via the input orifice 2 is limited. Corona discharge plasma acts on water contained in input waste causing generation of free radicals upon disruption of water molecule $H_2O \rightarrow OH^\bullet + H^\bullet$. Additionally, streamers of pulse corona discharge cause formation of other active substances, namely $O_3$, $O_2(a^1\Delta)$, $H_2O_2$, OH, $O(^3P)$, NO, $HNO_2$ and $HNO_3$ in the reactor. Corona discharge is also a source of ultraviolet (UV) radiation. The active substances and UV radiation provide a disruptive impact upon any organic and inorganic substances contained in waste to be processed, thus assuring disintegration thereof with formation of harmless gaseous products, namely water and carbon dioxide. Inorganic content of waste is disrupted by acids $HNO_2$ and $HNO_3$ formed in the reactor due to the corona discharge. Oxidation process in water for organic substances is a chain reaction [2]. A low rate chain reaction may be initiated by atmospheric oxygen and ozone. A high rate chain reaction is initiated by OH• radicals. In other words, plasma-chemical destruction of both organic and inorganic substances contained in waste is provided in the device. Gaseous destruction products flow into the output orifice of the reactor.

Figure 2:
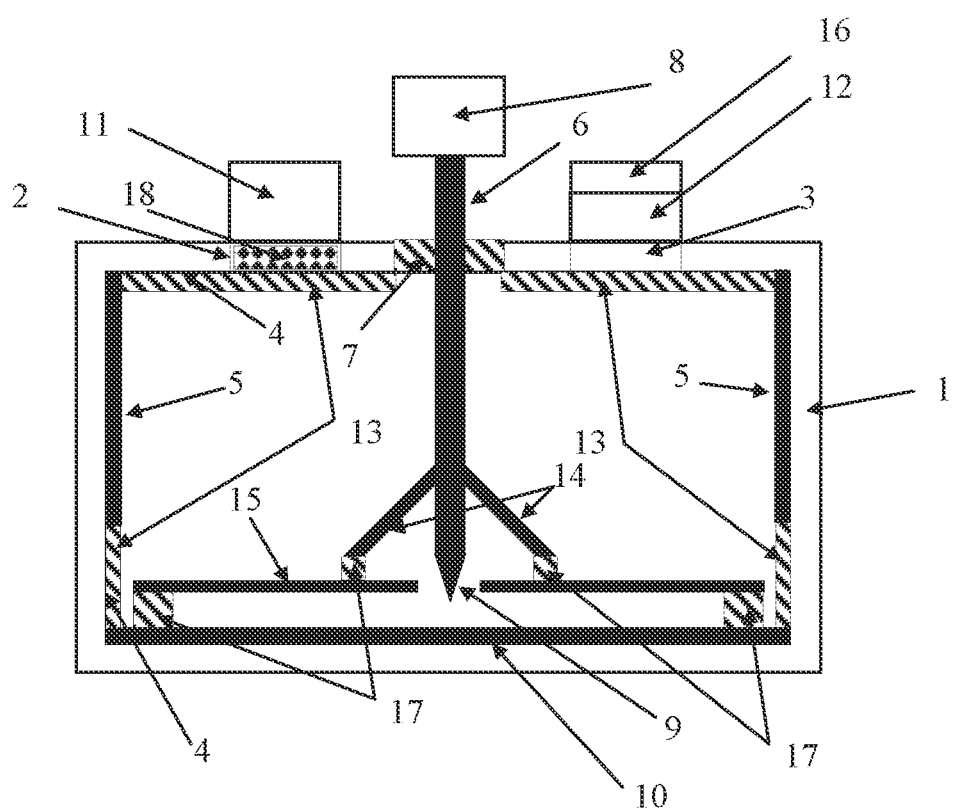
FIG. 2 shows additional detail of an embodiment of the reactor.

FIG. 2 shows additional detail of an embodiment of the reactor. In this figure, the additional elements are designated as follows:

13—protective coating made of a dielectric material;
14—steel ribs;
15—steel grid;
16—sucking air blower;
17—isolating spacers;
18—wad is pre-formed by pressurizing waste.

Thus, the indicated technical effect is obtained by the device owing to plasma-chemical destruction of both organic and inorganic substances contained in residential waste.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

REFERENCES

[1] Aristova N. A., Piskarev I. M., Ivanovskiy A. V., Selemir V. D., Spirov G. M., Shlepkin S. I., Initiation of chemical reactions by electrical discharge in dielectric-gas-liquid configuration. //Physical Chemistry Journal, 2004, Vol. 78, #7, pages 1326-1331.)

[2] Piskarev I. M., Oxidation-reduction processes in water initiated by electrical discharge above water surface. //General Chemistry Journal, 2001, Vol. 71, Issue 10, page 1622.

What is claimed is:

1. A reactor for waste destruction, comprising:
a housing in a form of a cavity with an input orifice in an upper portion of the cavity connected to a waste feed apparatus that supplies solid and liquid waste, and an output orifice for outputting gaseous products of the waste destruction,
wherein inner surfaces of the cavity are entirely or partially conductive, such that a bottom surface of the inner surfaces is entirely conductive, and upper portions of vertical walls of the inner surfaces are conductive, while lower portions of the vertical walls of the inner surface are non-conductive;
an electrode inserted into the cavity through the upper portion of the cavity, wherein the electrode is isolated from the inner surfaces; and
a source of high-voltage pulses connected to the electrode,
wherein a size of a gap between the electrode and the bottom surface is configured to generate streamers of pulse corona discharge plasma when the high-voltage pulses are supplied to the electrode, so as to effect the waste destruction of the solid and liquid waste in the cavity.

2. The reactor of claim 1, wherein the electrode is made of steel.

3. The reactor of claim 1, wherein a bottom of the cavity is covered by a conductive moisture-containing liquid.

4. The reactor of claim 1, wherein a gap between the electrode and at least one portion of conductive portions of the inner surfaces of the cavity is 5 to 50 mm.

5. The reactor of claim 3, wherein a gap between the electrode and a surface of a conductive moisture-containing liquid covering a portion of the conductive inner surface of the cavity is 5 to 50 mm.

6. The reactor of claim 1, wherein conductive portions of the inner surfaces of the cavity are made of steel or metal or metal alloy and are grounded.

7. The reactor of claim 1, wherein non-conductive portions of the inner surfaces of the cavity have a protective coating made of a dielectric material.

8. The reactor of claim 1, wherein the electrode is cylindrically shaped and has a sharpened tip.

9. The reactor of claim 8, wherein the electrode is equipped with ribs shaped as steel strips attached to the electrode by short sides thereof, while long sides of the steel strips are directed to the electrode and the ribs are angularly disposed relative to the electrode towards a tip of the electrode.

10. The reactor of claim 9, wherein the angle between the steel ribs and axis of the electrode is 20 to 60 degrees.

11. The reactor of claim 9, wherein the cylindrical electrode is equipped with 3 to 6 steel ribs.

12. The reactor of claim 9, wherein a steel grid is secured in parallel to a bottom of the cavity through isolating spacers attached to the bottom, wherein the grid has an opening for the electrode so as to form a gap around the electrode, and wherein free ends of the ribs abut on the isolating spacers secured to the grid.

13. The reactor of claim 8, wherein a bottom of the cavity is flat and conductive and the electrode is located with a gap transversally to the bottom of the cavity.

14. The reactor of claim 8, wherein a gap around the cylindrical electrode is 3 to 10 mm, but it is less than a gap between the electrode tip and the conductive bottom.

15. The reactor of claim 1, wherein pressure inside the reactor is 0.1 to 1 Pa lower than atmospheric pressure.

16. The reactor of claim 1, wherein under-pressure inside the reactor is provided by connecting an electrostatic filter with a sucking air blower, located outside the cavity, to the output orifice.

17. The reactor of claim 1, wherein intake of air is limited by a wad that closes the input orifice of the reactor, wherein the wad is pre-formed by pressurizing waste prior to feeding the waste to the reactor.

18. A reactor for waste destruction, comprising:
- a housing in a form of a cavity with an input orifice connected to a waste feed apparatus that supplies solid and liquid waste, wherein intake of air into the cavity is restricted by a compressed wad of the solid waste, and an output orifice for outputting gaseous products of the waste destruction,
- wherein a bottom surface of the inner surfaces is entirely conductive, and upper portions of vertical walls of the inner surfaces are conductive, while lower portions of the vertical walls of the inner surface are non-conductive;
- an electrode inserted into the cavity through the upper portion of the cavity, wherein the electrode is isolated from the inner surfaces; and
- a source of high-voltage pulses connected to the electrode,
- wherein a size of a gap between the electrode and the bottom surface is configured to generate streamers of pulse corona discharge plasma when the high-voltage pulses are supplied to the electrode, so as to effect the waste destruction of the solid and liquid waste in the cavity.

19. A reactor for waste destruction, comprising:
- a cavity with an input orifice in an upper portion of the cavity connected to a waste feed apparatus that supplies solid and liquid waste, and an output orifice for outputting gaseous products of the waste destruction,
- wherein a bottom surface of the inner surfaces is entirely conductive, and upper portions of vertical walls of the inner surfaces are conductive, while lower portions of the vertical walls of the inner surface are non-conductive;
- an electrode extending into the cavity through the upper portion of the cavity; and
- a source of high-voltage pulses connected to the electrode,
- wherein the reactor is configured to generate streamers of pulse corona discharge plasma when the high-voltage pulses are supplied to the electrode, so as to produce the waste destruction of the solid and liquid waste in the cavity.

* * * * *